Nov. 5, 1957     J. C. NEELY, JR     2,811,783
HEADLIGHT ADJUSTMENT APPARATUS
Filed May 26, 1955
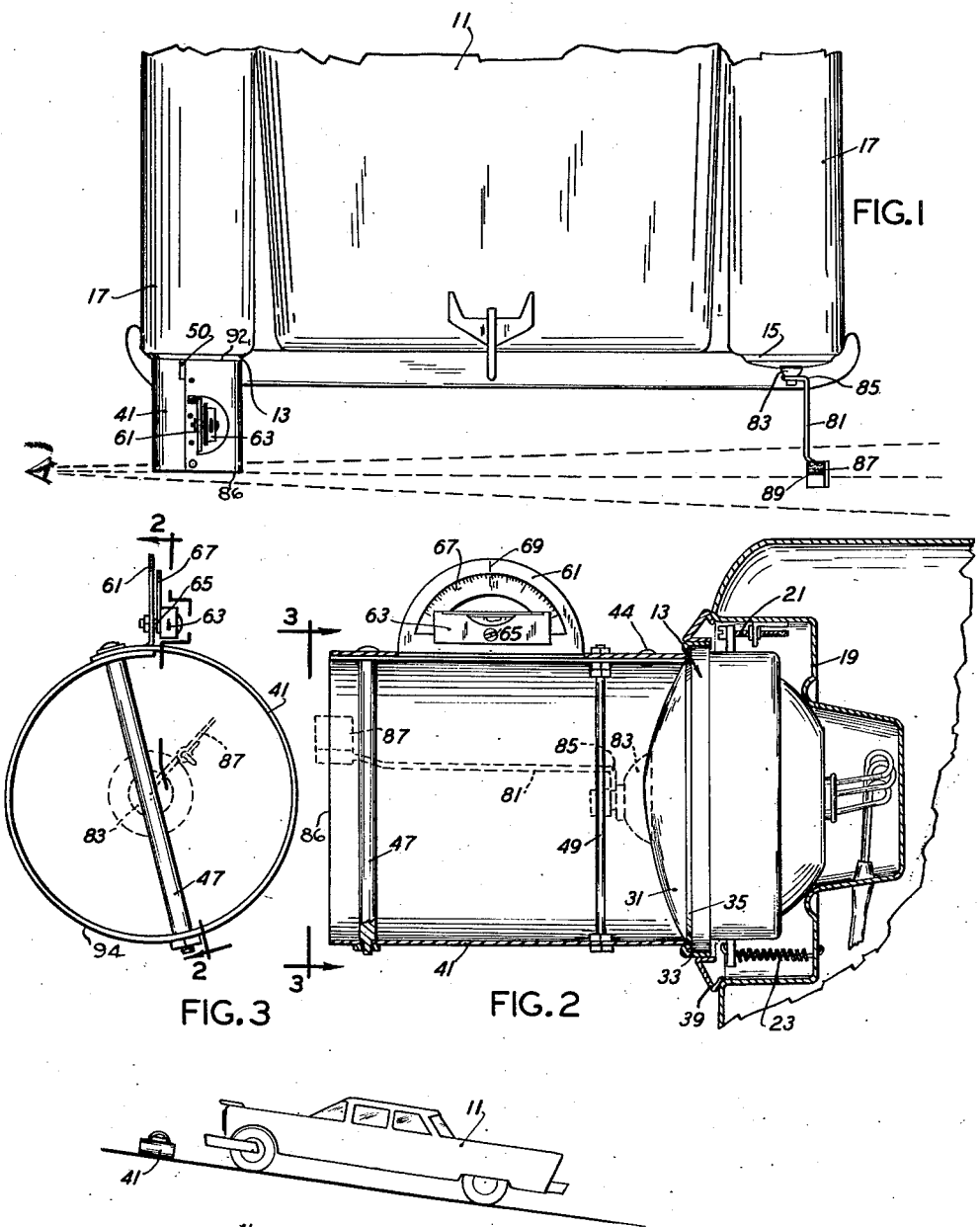
INVENTOR.
JOHN C. NEELY JR.
BY
ATTORNEYS United States Patent Office 2,811,783
Patented Nov. 5, 1957

2,811,783

HEADLIGHT ADJUSTMENT APPARATUS

John C. Neely, Jr., Eugene, Oreg.

Application May 26, 1955, Serial No. 511,271

3 Claims. (Cl. 33—180)

This invention relates to apparatus for adjusting the headlights of a vehicle, and particularly to apparatus of the type which facilitates headlight adjustment during the daylight hours and without dependence on the headlights being lit or energized.

Prior apparatus of this type is complicated, and conventionally such apparatus comprises two similar cylindrical testing units mounted on the two headlights of a vehicle, each unit facilitating vertical adjustment of its headlight. The two units are mechanically connected by a cord or line which cooperates with guides on the units to indicate when proper horizontal alignment of the headlight has been obtained.

A main object of the present invention is to provide a headlight adjustment apparatus of the above general type, but being much simpler in construction and thus less expensive than prior apparatus.

A more particular object of the present invention is to provide headlight adjusting apparatus including two units for the headlights of a vehicle, the units not being mechanically connected yet facilitating both horizontal and vertical adjustment of the headlights.

A further object is to provide a headlight adjusting apparatus including one cylindrical unit adapted to fit against one headlight of a vehicle and a simple target unit mountable on the other headlight of the vehicle, by which both vertical and horizontal adjustment of the headlights can be effected.

A further object of the present invention is to provide a cylindrical testing unit mountable on the headlight of a vehicle which is more simple and less expensive than prior units.

Various other objects of the present invention will be apparent from the following description taken in connection with accompanying drawings wherein:

Fig. 1 is a plan view of the front end of a vehicle showing an apparatus of the present invention applied to the headlights of the vehicle;

Fig. 2 is an enlarged sectional view taken along line 2—2 of Fig. 3, showing the construction of the cylindrical testing unit of the apparatus;

Fig. 3 is an end view of the cylindrical unit taken in the direction of the arrows 3—3 of Fig. 2;

Fig. 4 illustrates one step in the use of the apparatus of the invention; and

Fig. 5 is a fragmentary view in longitudinal section through a modified cylindrical testing unit.

Referring to the accompanying drawings, Fig. 1 shows an automobile 11 having a pair of headlights 13 and 15 mounted in a conventional manner in fenders 17, as best shown in Fig. 2 in the case of headlight 13. The mounting arrangement includes a headlight housing 19 in which the headlight fits and is adjustably supported by a vertical adjustment screw 21 and a tension spring 23, and a similar horizontal adjustment screw and spring (not shown).

The headlight includes a conventional convex lens 31 of a sealed-beam unit held in place by a retaining ring 33 which fits within an annular peripheral groove 35 on the lens. A headlight trim ring 39 normally covers the adjusting screws 21 and the springs 23 and must be removed to permit adjustment of the headlights.

The apparatus of the present invention includes a cylindrical testing unit comprising a cylindrical tubular body member 41 of a diameter and thickness to fit at its rear end within the retaining ring 33 and against the lens 31. The tubular member 41 is formed of a rectangular sheet metal piece having the longitudinal portions thereof overlapped (Fig. 3) and secured together by rivets 44 so that the opposite end edges of said body member are disposed in parallel planes perpendicular to the axis of said member. Suitable handles for the body member 41 are provided by spacers 47 and 49, which are connected at their ends to said member.

The inner of said overlapping portions is cut away at 50 (Fig. 1) to provide a rear end edge of single thickness. Thus, the adjacent parts of the member 41 at such edge are rendered yieldable permitting them to be forced into the annular groove 35 provided adjacent the inner edge of the retainer ring 33 and the lens 31 and seated against said lens so that the geometric axis of the headlight and the axis of said member will coincide.

A semicircular tab 61 is struck outwardly from the body member 41 to occupy a generally radial longitudinal plane of said member, and mounted on this tab is an inclinometer. The inclinometer includes a spirit level 63 pivoted at 65 on the tab 61 for movement about an axis normal to the just mentioned radial longitudinal plane. The pivotal mounting 65 is such that the spirit level is frictionally retained in any position of adjustment. The spirit level carries an index piece 67 which is graduated in terms of degrees, the particular index piece shown being as graduated for 180 degrees. An index mark 69 is provided on the tab 61 in cooperative relationship with the markings on the index piece 67.

The apparatus of the present invention also includes a target unit which comprises a rod 81 fastened at its rear end to the convex side of a suction cup 83. The rod 81 is angularly bent at 85 for a purpose to appear presently. Mounted on the forward end of the rod 81 is a target 87 which has an index mark 89 intermediate the ends thereof, the portion of the target rearwardly of the index mark being painted one color and the portion forwardly of the index mark being another color.

When the tubular body member 41 is held against the front of the headlight 13, as shown in Fig. 1, the plane containing the forward edges 86 of the body member will pass through the target 87 at the index mark 89, provided the headlight 13 has its geometric axis parallel to the longitudinal axis of the vehicle. If the headlight is not so adjusted, the plane containing the forward end of the tubular body member will miss the mark 89 and intersect another portion of the target or entirely miss the target, depending on the amount of misalignment.

The forward edge of the tubular body member thus constitutes a sight by which, upon lateral adjustment of a headlight, the index mark 89 may be brought, relatively speaking, into such line of sight. If desired, the forward end of the tubular body member may be rectangularly notched at diametrically opposed places, one of which is shown at 91 in Fig. 5, to provide two sighting notches. Thus, the forward edges 86 of the cylindrical testing unit may be considered as a sight device, and the rear edges 92 may be considered as a means for locating the line of sight of the sight device forwardly of one headlight of a vehicle at right angles to the geometric axis of the headlight.

In use, the tubular body member 41 is placed on the surface on which the vehicle is parked, as shown in Fig.

4, with the axis of the tubular body member arranged parallel to the longitudinal axis of the vehicle. Thus the bottom surface 94 of the tubular body member may be considered as supporting portions normal to the line of sight of the sight device for engagement with the surface supporting the vehicle so that the spirit level may be adjusted to determine the inclination of the supporting surface preparatory to vertical adjustment of the headlights. The inclinometer is adjusted by pivoting the spirit level 63 until the bubble is brought to the level position. The reading on the index piece 67 relative to the index mark 69 is noted.

The trim ring 39 is removed and then the tubular body member 41 is held against one of the headlights, headlight 13 in the particular instance shown, with the rear end of the tubular body member held seated against the lens of headlight 13 in the annular groove provided by the inner portion of the retainer ring 33 and the lens 31, and with the inclinometer upright.

Now, the vertical adjustment screw is adjusted until the bubble of the spirit level is in its level position, and this action disposes the headlight geometric axis of the headlight parallel to the longitudinal axis of the automobile and thus the beam of the headlight is inclined downwardly at the angle for which it is prefocused. Normally this will be one or one and one-half degrees. The same procedure may be followed with headlight 15 to check or adjust, if necessary, its vertical adjustment.

Next, the horizontal adjustment of the headlights must be checked. This is done by moistening and pressing the vacuum cup 83 of the target unit against the central portion of the lens of the headlight 15, and then placing the tubular body member 41 over the target unit, the offset portion at 85 in the rod 81 permitting the rod to bypass the spacers 47 and 49 of the tubular body member, as indicated in Fig. 3. Then, the user will sight across the forward end of the tubular body member or across the notches 91, if such notches are provided, and normally will find the index mark 89 directly in his line of sight. If not, the amount of displacement is noted.

Then, the tubular body member is removed and placed on the other headlight, for instance headlight 13, as shown in Fig. 1. Then, a second sighting is made. If the index mark 89 on the target does not coincide with the line of sight, headlight 13 is out of horizontal adjustment and its horizontal adjustment screw is adjusted until the line of sight and said mark do coincide.

Then the procedure is reversed with the target unit 81 mounted on the headlight 13 and with the tubular body member 41 mounted on the headlight 15 and an adjustment made to make the line of sight across the forward end of member 41 coincide with the target index mark 89. In case a displacement of the line of sight from the mark was noted when both units were on one headlight, the adjustment here under discussion is made to achieve the same displacement previously noted. It is here pointed out that the horizontal misalignment of the headlight 15 will have little effect on the horizontal adjustment of headlight 13, because the position of the index mark 89 forwardly of headlight 13 remains substantially the same despite a slight angularity between the rod 81 and the longitudinal axis of the vehicle.

The lateral and vertical alignment of one headlight may be accomplished at the time the body member 41 is on one headlight and the target unit is on the other.

Having described the invention in what is considered to be the preferred embodiment thereof, it is desired that it be understood that the invention is not to be limited other than by the provisions of the following claims.

I claim:

1. An apparatus for facilitating the adjustment of the headlights of a vehicle, comprising a sight device including means for locating the line of sight thereof forwardly of one headlight of a vehicle at right angles to the geometric axis of said one headlight and horizontally in the direction of the other headlight, a target, means for mounting said target on said other headlight and in said line of sight when said one headlight is adjusted to bring the geometric axis thereof into parallelism with the longitudinal axis of said vehicle, and a spirit level mounted on said sight device for pivotal movement about an axis parallel to said line of sight, said spirit level extending in a direction normal to said line of sight, said apparatus having supporting portions normal to said line of sight for engagement with the surface supporting said vehicle so that said spirit level may be adjusted to determine the inclination of said supporting surface preparatory to vertical adjustment of said headlights, and means for releasably holding said spirit level in any position of adjustment to maintain a desired position of said spirit level during adjustment of the headlights.

2. A device for facilitating adjustment of the headlight of a vehicle, comprising a cylindrical, tubular member comprising a single rectangular sheet having longitudinal edge portions overlapped and secured together, one of said edge portions being cut away adjacent one end of said member so as to provide said member with an edge of single thickness throughout, a tab struck from said cylindrical member and extending away from the body of said tubular member in a generally radial plane, an inclinometer pivotally mounted on said tab on a pivotal axis at right angles to said radial plane, and means for releasably holding said inclinometer in any position of adjustment so that after said device is placed on a roadway and said inclinometer adjusted to determine the inclination of said roadway, such adjusted position will be maintained during vertical adjustment of said headlights.

3. An apparatus for facilitating the adjustment of the headlights of a vehicle, comprising a sight device including means for locating the line of sight thereof forwardly of one headlight of a vehicle at right angles to the geometric axis of said one headlight and horizontally in the general direction of but forwardly of the other headlight, a target, means for mounting said target on said other headlight and in said line of sight when said one headlight is adjusted to bring the geometric axis thereof into a predetermined relationship with the longitudinal axis of said vehicle, an inclinometer mounted on said sight device for pivotal movement about an axis extending parallel to said line of sight, said inclinometer extending in a direction generally normal to said line of sight, said apparatus having supporting portions normal to said line of sight for engagement with the surface supporting said vehicle so that said inclinometer may be adjusted to determine the inclination of said supporting surface preparatory to vertical adjustment of said headlights, and means for releasably holding said inclinometer in any position of adjustment to maintain a desired position of said inclinometer during adjustment of the headlights.

References Cited in the file of this patent
UNITED STATES PATENTS

| | | |
|---|---|---|
| 1,779,404 | Kenworthy | Oct. 21, 1930 |
| 2,127,734 | Hill | Aug. 23, 1938 |
| 2,173,597 | Smalley | Sept. 19, 1939 |
| 2,557,893 | Russell et al. | June 19, 1951 |
| 2,609,611 | Dickson | Sept. 9, 1952 |